Dec. 1, 1931.

C. H. LAND 1,833,969

CONTROL VALVE FOR SHOCK ABSORBERS

Filed July 11, 1930   2 Sheets-Sheet 1

Charles H. Land
INVENTOR

BY S. E. Thomas
ATTORNEY

Dec. 1, 1931.    C. H. LAND    1,833,969
CONTROL VALVE FOR SHOCK ABSORBERS
Filed July 11, 1930    2 Sheets-Sheet 2

Charles H. Land    Inventor
By S. E. Thomas    Attorney

Patented Dec. 1, 1931                                             1,833,969

UNITED STATES PATENT OFFICE

CHARLES H. LAND, OF GROSSE POINTE, MICHIGAN, ASSIGNOR TO MECHANICAL DEVELOPMENT COMPANY, OF DETROIT, MICHIGAN, A CORPORATION OF MICHIGAN

CONTROL VALVE FOR SHOCK ABSORBERS

Application filed July 11, 1930. Serial No. 467,277.

My invention relates to an improvement in hydraulic shock absorbers and more particularly shock absorbers for motor vehicles, shown in the accompanying drawings and described in the following specification and claims.

The type of shock absorber embodying this invention includes a swinging impeller free to vibrate in a fluid chamber when the vehicle springs are functioning under ordinary conditions, but which under excessive rates of deflection is controlled by a plurality of relief valves—loaded open—respectively serving to automatically control the flow of the fluid in either direction through the impeller and thereby the velocity of approach and recession of the axle and body of the vehicle in relation to each other thus determining a velocity which may not be exceeded.

The primary object of the present invention relates to an efficient relief valve for the class of shock absorbers described, of simple construction that it may be produced at a low manufacturing cost for installation as a unit, upon a minimum expenditure of time and labor.

A further object of the invention is to provide a relief valve constructed of sheet metal, by suitable stamping and shaping dies, of a cartridge-like form for insertion in the swinging impeller without further adjustment of parts,—ready for operation.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Referring now to the letters of reference placed upon the drawings:

A, A denotes a two-part casing secured to the frame of a vehicle by bolts,—not shown,—extending through the apertures $A^1$, $A^1$.

B is an oscillating piston or impeller, comprising two plates $B^1$, $B^1$ secured to a radially projecting fin C integral with a hub $C^1$ formed on the end of a stub shaft $C^2$, in turn journaled in a sleeve $A^2$ extending from one section of the wall of the case. The stub shaft $C^2$ is fitted with a lever arm, not shown, for connection with the axle of a vehicle.

D denotes a suitable packing, lodged between the plates B, B to insure tight contact between the impeller and the inner wall of the inclosing case.

E indicates a segmental dam extending from side wall to side wall of the casing and conforming to the arc of the latter and of the hub of the impeller.

F denotes a suitable by-pass through the hub, and G is a screw-threaded closure plug extending through the wall of the casing which upon being removed provides an opening through which the housing may be filled with oil.

The foregoing is briefly explanatory of the device to which the instant invention is applied, as it forms no part of the present invention it will not require an extended description.

H denotes the relief valve mounted transversely in an opening extending through the walls B, B and through the radially projecting fin C of the hub C¹. The valves H, H are preferably constructed of sheet metal, and comprise a flat disc portion I having an inwardly bent marginal flange I¹ underlying the face of the disc with a plurality of resilient legs I² spaced apart, struck from the body of the metal and extending at right angles to the inner face of the disc. The free end of the legs I² have a return bend of wedge-shaped form I³ adapted upon insertion through the port-holes B², B² in the plates B¹ to expand and overlap the inner face of said plates, whereby said valve-discs while free to close under excessive pressure are held against accidental release, when forced apart by a spring located between the discs to a "loaded open" position.

The spring J located between and bearing upon the opposing inner faces of the valve-discs, is confined in axial relation to the discs by their respective inwardly extending overlapping resilient legs.

Figure 8:
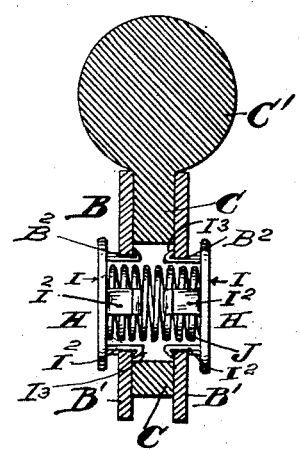
Figure 8 is a cross-sectional view through the impeller, showing the relief valves mounted therein in their "loaded open" position and a spring between the valve discs.

Under the urge of the spring J, the discs are normally maintained at their maximum open position, the overlapping wedge-shaped foot portions at the free end of the legs bearing upon the inner face of the plates B, B to limit further outward movement,—as clearly indicated in Figure 8.

Figure 1:
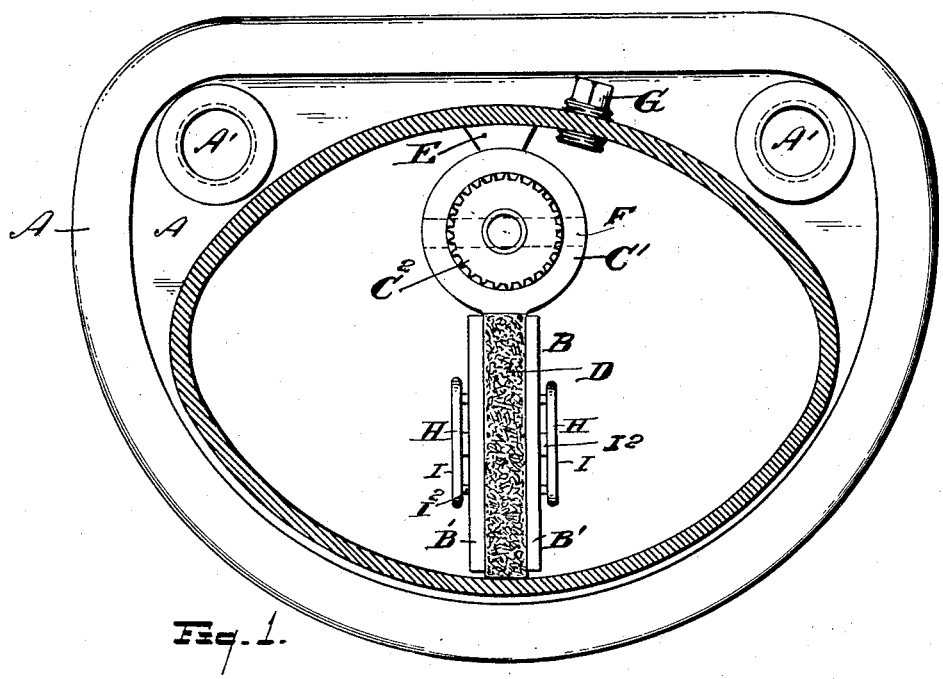
Figure 1 is a side elevation and vertical longitudinal sectional view through the inclosing case of a shock absorber, showing the relief valve in the swinging impeller in "open" position, as when the impeller is vibrating under normal riding conditions.
Figure 2:
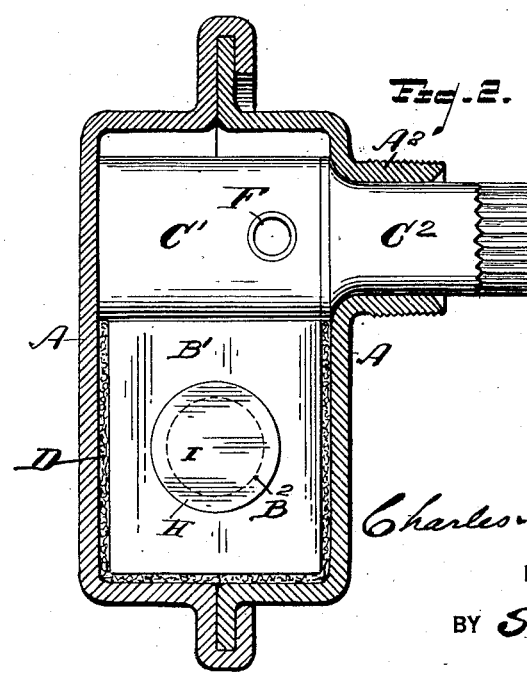
Figure 2 is a cross-sectional view through the inclosing case, showing the relief valve mounted in the swinging impeller.
Figure 3:
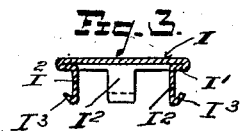
Figure 3 is a cross-sectional view through one of the relief valve discs, showing its integral resilient automatically actuated locking legs.
Figure 4:
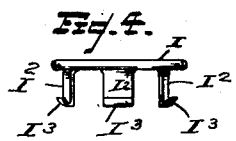
Figure 4 is a side elevation of the same.
Figure 5:
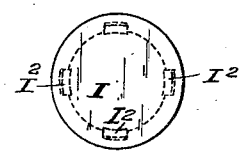
Figure 5 is an elevation of one of the valve discs, indicating in dotted lines the locking legs projecting from the opposite side of the disc.
Figure 6:
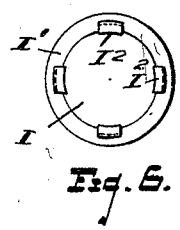
Figure 6 is a view of the opposite face of the valve disc, showing the locking legs in full lines.
Figure 7:
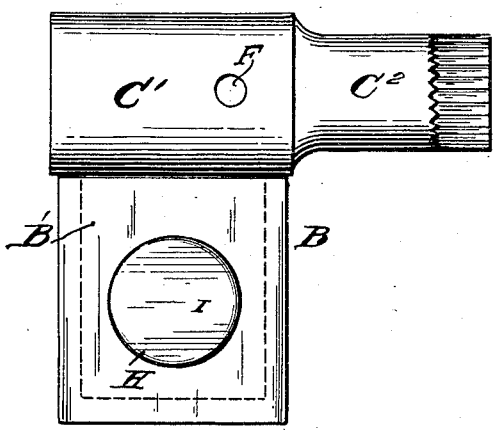
Figure 7 is a side elevation of the swinging impeller removed from the case with the relief valve in position.

In the operation of this device, when the vehicle is normally loaded, the piston or impeller B will extend in a vertical direction approximately midway between the sides of the casing as indicated in Figure 1.

At the normal velocity of the impeller, either to the right or left, the liquid maintained in the casing will pass through the port openings provided for the valves and thence between the resilient legs of the discs with very slight resistance. Upon a rapid acceleration to the right, the open valve at the right will gradually close, throttling the flow of the fluid and producing a uniformly increasing resistance to the movement of the impeller.

It will likewise be obvious that the same result will also obtain upon a movement of the impeller in the opposite direction, with the spring J functioning to restore the valves to their open loaded position immediately following the return to normal vibration of the vehicle body.

It too will be noted that by providing a loaded-open valve, the normal up and down movement of the vehicle spring is not checked except when a sudden excessive movement is developed due to road conditions;—these sudden movements are automatically resisted in either direction and readily controlled by the cushioning effect of the auxiliary liquid flow resulting from a gradual closure of the relief valve.

Having thus described my invention, what I claim is:

1. A controlling valve, for a hydraulic shock absorber embodying a fluid chamber and a piston movable within a fluid chamber having an opening therethrough for the passage of fluid from one side of the piston to the other,—comprising two opposing discs adapted to alternately and gradually close the opening through the piston, each disc having a plurality of legs sleeved within said opening to guide the discs, with portions overlapping the wall of the piston to limit the opening movement and accidental detachment of the discs from the piston; and a spring located between and bearing against the inner face of each disc, whereby the discs may be forced outwardly to a loaded-open position to permit the passage of fluid when operating under normal conditions.

2. A controlling valve, for a hydraulic shock absorber embodying a fluid chamber and a swinging piston movable within the chamber having an opening therethrough for the passage of fluid from one side of the piston to the other; comprising two discs adapted to alternately and gradually close the opening through said piston, due to the cushioning effect of the fluid in the chamber upon the discs, producing a uniformly increasing resistance to the movement of the piston, each disc having a plurality of resilient inwardly directed opposing legs sleeved within the opening in the piston to guide the discs, said legs having at their free ends a return wedge-shaped bent adapted when pushed through the opening in the piston to overlap the wall of the piston, whereby the legs while free to move through said opening are held in the piston against accidental dislodgement; and a spring located between and bearing against the inner face of each disc, whereby the discs may be forced outwardly to a loaded-open position to permit the passage of fluid through the piston when oscillating under normal conditions.

3. A controlling valve for a hydraulic shock absorber, embodying a fluid chamber and an oscillating piston within the chamber having an opening therethrough for the passage of fluid from one side of the piston to the other, said valve comprising two discs adapted to alternately close the opening through the piston, said discs having their marginal edges bent underneath the face of the latter, forming an annular rim overlapping the wall of the piston, with integral resilient leg projecting portions, spaced apart, extending at right angles through the opening in the piston, their free ends bent to form wedge-shaped abutments overlapping the walls of the piston when inserted through said opening, whereby the outward movement of the discs may be limited and held against accidental dislodgement; and a spring, located within the spaced projecting leg portions of the opposing discs bearing against the respective faces of the latter to normally maintain the discs in loaded-open position for the passage of fluid through the piston.

4. A controlling valve for a hydraulic shock absorber, embodying a fluid chamber and a piston movable within the chamber ported for the passage of fluid from one side of the piston to the other, said valve comprising two discs adapted to alternately close said ported piston, having a plurality of inwardly directed opposing legs sleeved within the opening in said piston to guide the discs, with laterally extending abutments respectively overlapping the wall of the piston, whereby the valve discs while free to alternately open and close the ported area of the piston are held against accidental detachment from the piston; and a spring located between and bearing against the inner face of each disc, to force the said discs outwardly to a normally loaded-open position for the passage of fluid therethrough.

In testimony whereof, I sign this specification.

CHARLES H. LAND.